United States Patent [19]

Machui et al.

[11] Patent Number: 5,404,260
[45] Date of Patent: Apr. 4, 1995

[54] MAGNETIC RECORDING/PLAYBACK HEAD

[75] Inventors: Jurgen Machui, Bourg la Reine; Paul L. Meunier, Paris, both of France

[73] Assignee: Thomson-CSF, Puteaux, France

[21] Appl. No.: 66,932

[22] PCT Filed: Oct. 21, 1988

[86] PCT No.: PCT/FR88/00517

§ 371 Date: Jun. 23, 1989

§ 102(e) Date: Jun. 23, 1989

[87] PCT Pub. No.: WO89/04037

PCT Pub. Date: May 5, 1989

Related U.S. Application Data

[63] Continuation of Ser. No. 758,512, Sep. 6, 1991, abandoned, which is a continuation of Ser. No. 378,197, Jun. 23, 1989, abandoned.

[30] Foreign Application Priority Data

Oct. 27, 1987 [FR] France ................................. 87 14818

[51] Int. Cl.⁶ ............................................. G11B 5/147
[52] U.S. Cl. ...................................... 360/126; 360/119; 360/122
[58] Field of Search ................ 360/119, 120, 122, 125, 360/126

[56] References Cited

U.S. PATENT DOCUMENTS 3,845,503  10/1974  Kanai ........................... 360/125 X
3,893,187   7/1975  Kanai et al. .................... 360/125 X
4,100,584   7/1978  Behr ................................ 360/125
4,670,972   6/1987  Sakakima ......................... 29/603

FOREIGN PATENT DOCUMENTS 0185406   6/1986  European Pat. Off. .
1272521   6/1961  France .
55-64626   5/1980  Japan .
56-65325   6/1981  Japan .
57-26412   2/1982  Japan .
0051604   3/1986  Japan ............................. 360/125
61-151818   7/1986  Japan .

OTHER PUBLICATIONS

Patent Abstracts of Japan, vol. 8, No.: 97 (P-272) (15934) May 8, 1984, & JP,A598115 (Matsushta Denki Sangyo K.K.) Jan. 17, 1984.
Proceedings of the IEEE, vol. 74, No.: 11, Nov. 1986, IEEE, (New York, U.S.) F. Jeffers: "High-Density Magnetic Recording Heads", pp. 1540–1556.

*Primary Examiner*—Andrew L. Sniezek
*Attorney, Agent, or Firm*—Oblon, Spivak, McClelland, Maier & Neustadt

[57] ABSTRACT

Magnetic head comprising two magnetic circuits (1, 1') attached to each other. Two parts (14, 14') made of non-magnetic material are located beneath the gap of the head. The magnetic poles 3, 3' are made with thin layers on the magnetic circuits (1, 1') and the parts made of non-magnetic material. The material for bonding the magnetic circuits sets up the gap (5) between the poles (3, 3').

9 Claims, 4 Drawing Sheets

FIG_1
(PRIOR ART)
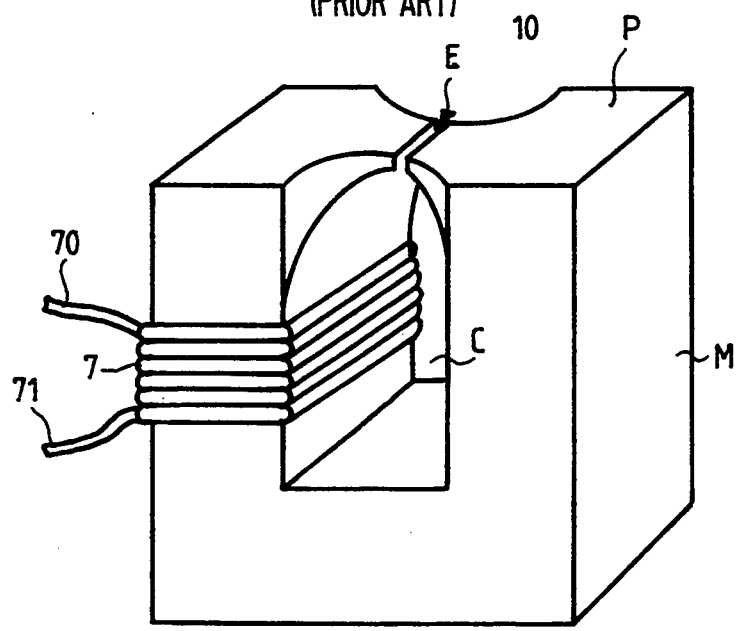
FIG_2
(PRIOR ART)
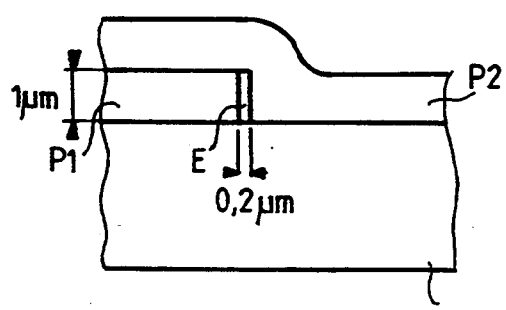
FIG_3
(PRIOR ART)
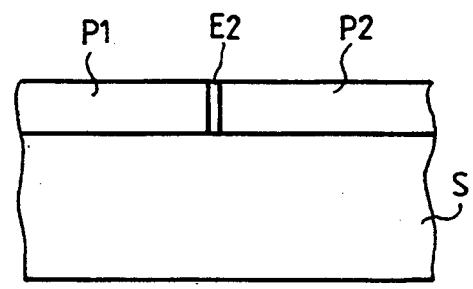

FIG_4
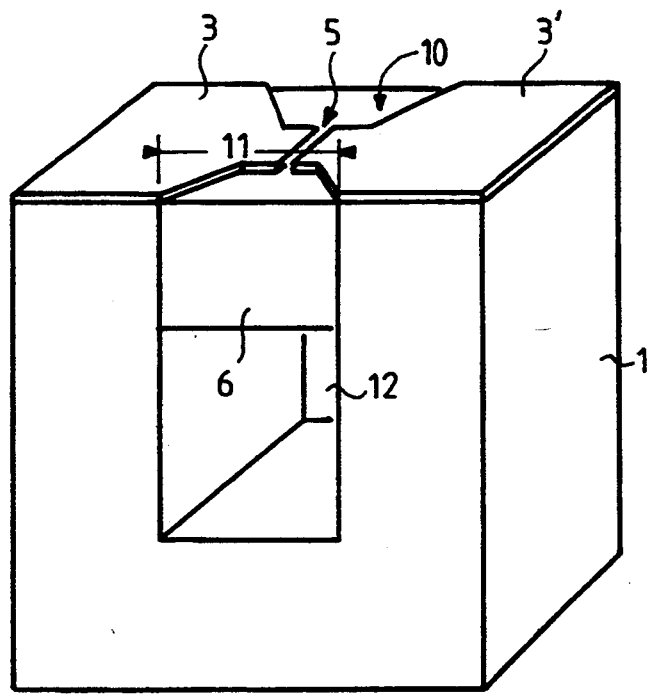
FIG_5
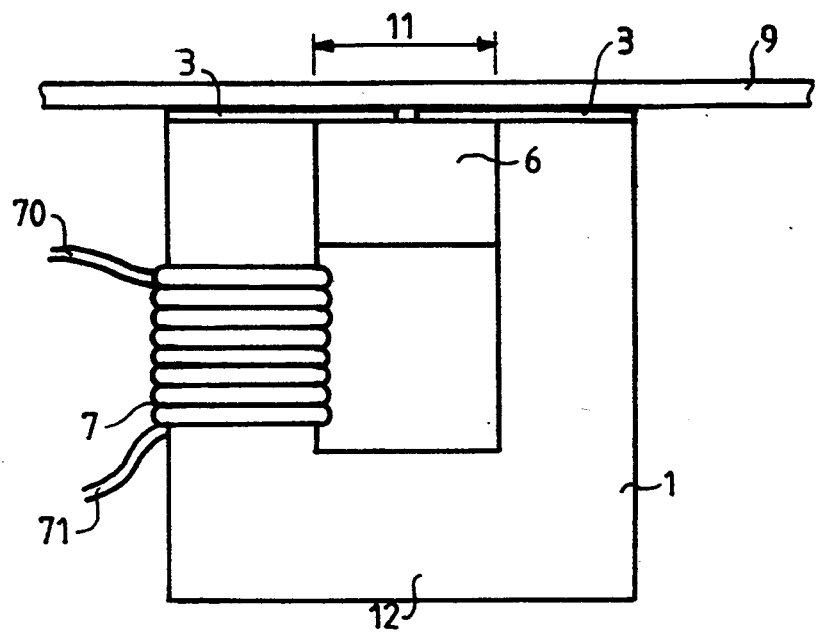

FIG_6
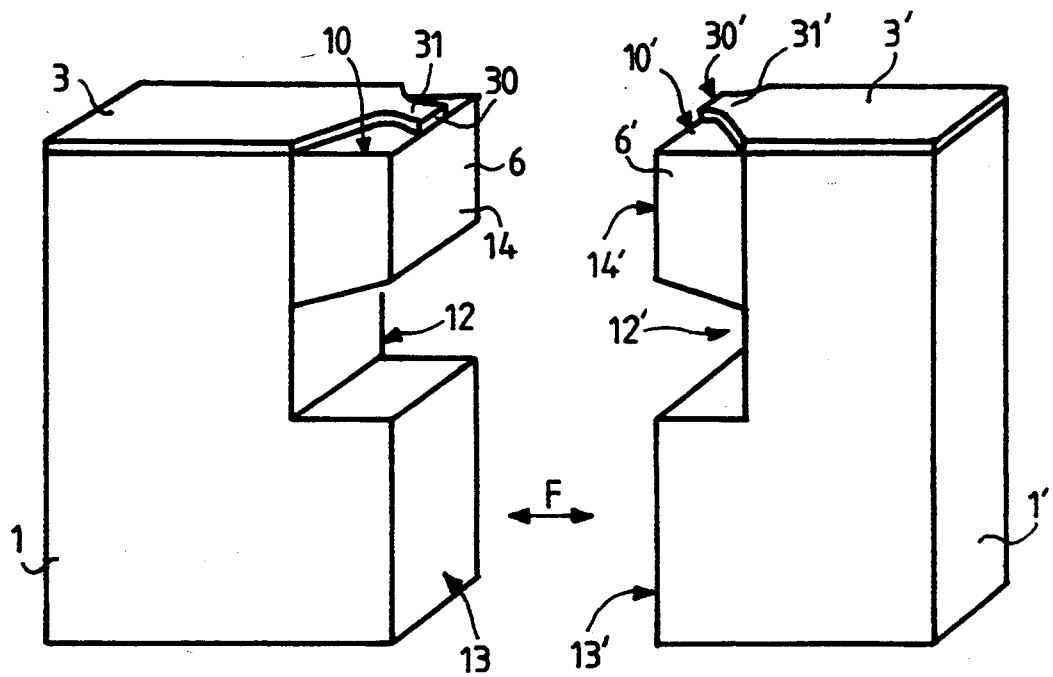
FIG_7
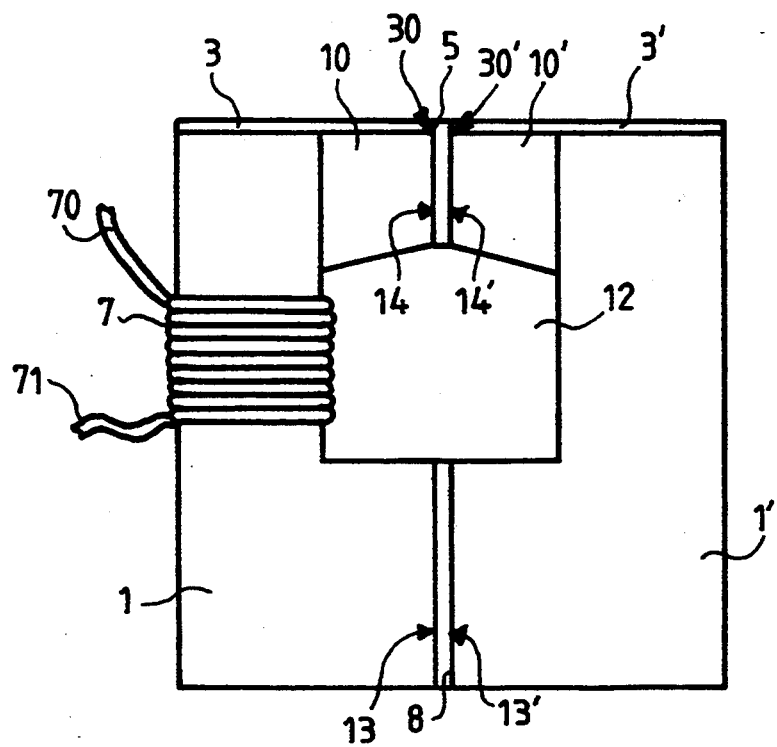

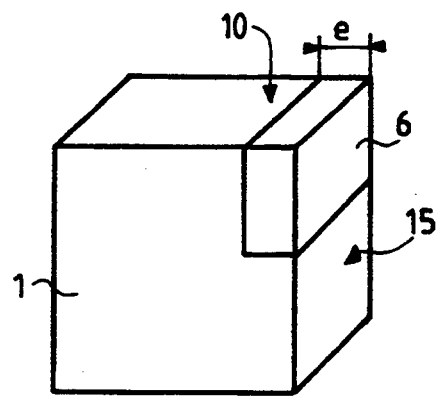
FIG_8
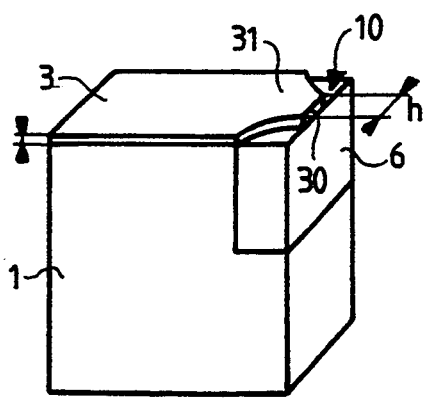
FIG_9
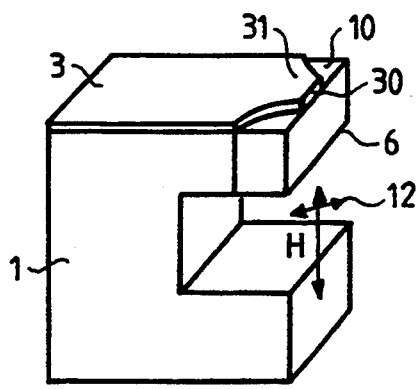
FIG_10
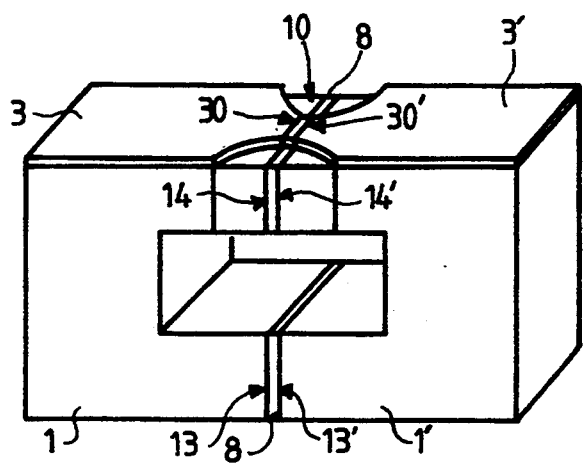
FIG_11

MAGNETIC RECORDING/PLAYBACK HEAD

This application is a Continuation of application Ser. No. 07/758,512, filed Sep. 6, 1991, abandoned, which is a Continuation of Ser. No. 07/378,197, filed Jun. 23, 1989, abandoned, which was filed as International Application No. PCT/FR88/00517, on Oct. 21, 1988.

BACKGROUND OF THE INVENTION

1. Field of the Invention

The present invention concerns a magnetic recording/playback head and, more particularly, a plane head, namely a magnetic head wherein the magnetic poles are located along one and the same plane. A magnetic head of this type can be used particularly in techniques for recording/playback on magnetic tapes. The invention also concerns a method for making a magnetic head of this type.

2. Discussion of the Background

The making of plane magnetic heads, of the shape shown in FIG. 1, is known.

These heads possess a magnetic circuit M having a plane face P. The magnetic poles of the recording head and the gap that separates them are located along this plane P. The recording medium such as a magnetic tape is placed, in the vicinity of the magnetic poles and of the gap E, parallel to the plane P. A magnetic field induction coil, supplied with current through the connections 70 and 71, surround an arm of the magnetic circuit M. As can be seen in FIG. 1, a head of this type has a narrowed portion at the gap E. This narrowed portion is brittle and difficult to make.

The invention concerns a head of this type which is less brittle and easier to make.

Furthermore, in known plane heads, the size of the gap (thickness of 0.2 micrometers and height of one micrometer) necessitates achieving growths of non-plane materials as described, for example, in the French patent application No. 86 14974, filed on 28th Oct., 1986. Thus, as shown in FIG. 2, a magnetic pole P1 is made on a substrate S with a layer of non-magnetic material E placed on a flank of the pole P1. Another layer of magnetic material (P2) is deposited on the unit. Then the upper face of the head is machined to obtain a plane magnetic head as shown in FIG. 3, with the magnetic poles P1 and P2 separated by a gap E.

As can be seen in FIG. 2, the layer of magnetic material forming the magnetic pole P2 must match the shape of the gap E: this disturbs the magnetic properties at the edge of the gap E. The definition of the gap and the discontinuity that it creates in the magnetic field thus get deteriorated, and this happens in a zone extending to a distance equal to some multiples of the height of the gap, measured from the gap.

However, it is essential to make thin layers of a thickness of 2 to 3 micrometers for plane magnetic heads. According to this technique, the magnetic pole P2 is thus dependent on the height of the gap.

The invention provides, according to one variant embodiment, for resolving this difficulty.

SUMMARY OF THE INVENTION

The invention thus concerns a magnetic head comprising a magnetic circuit of massive form comprising a plane face corresponding to the recording face of the head, characterized in that this magnetic circuit comprises:

an interruption in the magnetic circuit substantially perpendicular to said plane face, said interruption comprising a non-magnetic material which is flush with the plane face of the magnetic circuit;

two layers of a magnetic circuit forming the magnetic poles of the head, deposited on said plane face and separated by a gap located at the non-magnetic material.

The invention also concerns a magnetic head characterized in that the magnetic circuit has two U-shaped parts bonded to each other by the ends, one of the ends of at least one of these two parts comprising a part made of non-magnetic material which is flush with said plane face, the two layers made of magnetic material being made on said plane face with the gap located at the part made of non-magnetic material.

Finally, the invention concerns a method for fabricating a magnetic head, characterized in that it comprises the following steps:

a first step for making a part made of magnetic material, having at least one plane face and, incorporated in this part, an element made of non-magnetic material flush with the plane face on a determined surface;

a second step for making an aperture in the part made of magnetic material, reaching the element made of non-magnetic material in such a way that this element forms an interruption in the magnetic circuit formed by said part;

a third step for making magnetic poles located on the plane face and having two edges separated by a gap located on said determined surface occupied by the element made of non-magnetic material, these magnetic poles being made by means of a thin layer of magnetic material;

a fourth step for making at least one magnetic induction coil going through the aperture and surrounding the magnetic circuit of the part made of magnetic material.

BRIEF DESCRIPTION OF THE DRAWINGS

The various objects and features of the invention will appear more clearly from the following description, made in referring to the appended drawings, which represent:

FIG. 1, a plane magnetic head of the prior art and described above;

FIGS. 2 and 3, an embodiment of magnetic poles, separated by a gap for a plane magnetic head, as known in the prior art and described above;

FIG. 4, a perspective view of an embodiment of a magnetic head according to the invention;

FIG. 5, a front view of the magnetic head of FIG. 1;

FIG. 6, a perspective view of a variant of an embodiment of a magnetic head according to the invention;

FIG. 7, a front view of the magnetic head of FIG. 6;

FIGS. 8 to 11, steps of an example of a method for fabrication of the magnetic head according to the invention.

DESCRIPTION OF THE PREFERRED EMBODIMENTS

Referring to FIGS. 4 and 5, we shall first of all describe an embodiment of the magnetic head according to the invention.

This head has a magnetic circuit made in massive form. This magnetic circuit has a plane face 10. Substantially in the middle of this plane face, the magnetic circuit is interrupted over a width 11 and has, in the interruption, an element made of non-magnetic material 6. On the face 10 comprising non-magnetic material (6) with, on either side, magnetic material (1), two magnetic poles 3 and 3' are made, separated by a gap 5 located substantially in the middle of the element 6. These magnetic poles are made by means of a thin-layered magnetic material. Each pole covers the magnetic material located on one side of the element 6 and gets narrowed down, on the part 6 made of non-magnetic material, up to the gap 5. Thus, the magnetic circuit 1 gets looped by the magnetic poles 3 and 3' and by the gap 5. The width 11 of the element made of non-magnetic material 6 is appreciably greater than the width of the gap 5 so that the magnetic field gets looped by the gap 5.

The magnetic circuit has an aperture 12 enabling, as shown in FIG. 5, the winding of a magnetic field induction coil 7 which can be supplied with current by connections 70 and 71. This coil thus enables the induction of a magnetic field in the magnetic circuit. FIG. 5 shows a single coil 7, but it is clear that several coils can be provided for.

The magnetic poles 3, 3' may be made so that the gap 5 is perpendicular with respect to the axis XX' of movement of the recording medium, but it may also be such that the gap 5 makes an angle different from 90°.

According to the invention, a plane-shaped recording/playback head has thus been made, enabling recording on a magnetic tape or playing it back.

FIG. 6 represents a variant embodiment of a plane magnetic head according to the invention.

This magnetic head has two magnetic circuits 1 and 1' which have been separated in FIG. 6 to give a clearer representation.

Each magnetic circuit has a part made of non-magnetic material 6, 6'. Each part 6, 6' has a face 14, 14' which is in the same plane as a face 13, 13' of the magnetic circuit 1, 1'. The two magnetic circuits 1, 1' are attached to each other, along the arrow F, by the faces 13, 13' and 14, 14'.

The upper parts of the magnetic circuits 1, 1' and of the parts made of non-magnetic material, 6, 6' have plane faces 10, 10'. On these plane faces, there are magnetic poles 3, 3; formed by a thin layer of a magnetic material. Each magnetic pole 3, 3' is flush with the face 14, 14' of the part made of non-magnetic material 6, 6'. Each pole thus ends by a face (30, 30') contained in one and the same plane as the faces 14, 14' of the parts 6, 6'.

Furthermore, each magnetic pole 3, 3', has, at the edges of its face 30, 30', a narrowed portion 31, 31', the shape of which enables the concentration of the magnetic flux.

The two magnetic circuits being attached along the arrow F, the faces 13 and 13' are opposite each other and the faces 30 and 30' of the poles are also opposite each other. As shown in FIG. 7, the two magnetic circuits are solidly joined to each other by a layer of bonder material placed between the faces 13, 13' and 14, 14'. The faces 13, 13' are bonded by a layer 8. The faces 14, 14' and 30, 30' are bonded by a layer 5. The bonding material may be a glass-based material.

The layer 5 takes the place of a gap between the faces 30 and 30' of the magnetic poles. The bonding material may be a glass-based material. A coil 7, supplied in circuit by the connections 70, 71, and surrounding an arm of a magnetic circuit, completes the recording/playback head.

It must be noted that the faces 30, 13, 14 and 30', 13', 14' may be perpendicular to the axis XX' of movement of a recording medium (not shown). They may also, while at the same time being parallel to one another, make a angle different from 90° with this axis XX'.

Referring to FIGS. 8 to 11, we shall now describe an embodiment, according to the invention, of the plane magnetic head of FIGS. 6 and 7.

In a first step (FIG. 8) of this method, two parts 1 of magnetic material are made, comprising, in a corner of each part, an element 6 made of non-magnetic material. This element 6 is flush with a face 10 and the face 15 of the part 1. The thickness e of the part 6 along the face 10 is, for example, about 100 micrometers.

During a second step (FIG. 9) there is made, on the face 10 of each part 1, a thin-layered magnetic pole. The pole covers, on the face 10, the magnetic material of the part 1 so as to receive the entire magnetic field flowing in the magnetic circuit of the magnetic head. On the zone of non-magnetic material of the face 10, the pole 3 is made with a narrowed portion 31. The thickness h of the thin layer of magnetic material will be 1 to 3 micrometers for example.

The making of the magnetic pole will be done by any deposition process such as an epitaxial process, followed by an etching operation to achieve the narrowed portion 30.

During a third step, a notch 12 is made starting from the face 15 of the part 1. This notch reaches the element 6, or even as shown in FIGS. 9 and 10, removes a part of the element 6. The height H of this notch will be, for example, 200 to 300 micrometers, and its depth too will be 200 to 300 micrometers.

During a fourth step, shown in FIG. 11, two parts are bonded together as shown in FIG. 10. The faces 13 and 13' of two parts are bonded to each other by a layer of bonder 8. The faces 30 and 30' as well as 14 and 14' are bonded to each other by a layer of bonder 5. The layer of bonder 5 forms the recording gap of the magnetic head. The thickness of the layer 5 is then about 0.2 micrometers.

The bonding is done by soldering with a glass based non-magnetic material for example. The technique used may be a glass sputtering process.

During a fifth step, not shown in the figures, one or more magnetic field induction coils are made, surrounding at least one part 1 of the magnetic circuit.

According to a first variant of the method thus decribed, the step for making a notch 12 in each part 1 is performed before the second step for making the magnetic pole 3.

According to a second variant of the method of the invention, the fifth step for making the coil is planned after the step for making a notch 12 and before the step for bonding two parts 1, 1' to each other.

According to a third variant of the achieving of the method of the invention, the step for making the magnetic poles (3, 3') is planned after the bonding of two parts 1, 1' to each other. The magnetic poles 3, 3', separated by a gap 5 are then made on the faces 10, 10' by a known technique such as the one described in the French patent application No. 86 14974.

The method of the invention and all the variants thus described provide, after the bonding of two parts 1, 1', for a polishing of the faces 30, 13, 14, and 30', 13', 14'.

Furthermore, according to the invention, these faces may be perpendicular to an axis XX' of movement of a magnetic medium before the head but, according to another variant of the achieving of the method of the invention, there is provision for a machining stage, followed by a stage for polishing the faces 13, 14, and 30 at a determined angle with reference to the axis XX', this being done for a part 1. The part 1' to be bonded to the part 1 undergoes, during these stages, a machining and a polishing of the faces 13', 14', 30' at an angle which is supplementary (180°) to the previous angle with respect to the axis XX'.

According to another variant, after making the magnetic poles and bonding the two parts 1, 1', the magnetic head is coated, at these poles 3, 3' and on its face 10, 10', with a layer of a non-magnetic material, such as a silica-based material. Then, this layer is machined and polished until the magnetic poles 3, 3' are reached. This machining and polishing can be done so as to give a convex curvature to the magnetic head. As for the rest, it must be noted that the faces 10, 10' can be themselves machined so that the magnetic head has a curvature.

The fabrication method described earlier and its variants enable the obtaining of a magnetic head in accordance with FIGS. 6 and 7. To obtain a magnetic head in accordance with FIGS. 4 and 5, the invention provides for a method according to which an aperture 12 is made in the part 1 comprising a face 10 and an element made of non-magnetic material 6, integrated into the part 1 and being flush with the face 10. This aperture 12 is such that the element made of non-magnetic material 6 determines an interruption of the magnetic circuit 1.

Then, the magnetic poles 3 and 3' are made on the face 10 according to a technique such as that described in the French patent application No. 86 14974 with the gap perpendicular or slanting with respect to the axis XX'.

Finally, the coil or coils are made around a magnetic circuit.

It is clear that the above description has been given purely as a non-restrictive example. Other variants may be envisaged without going beyond the scope of the invention. The digital examples have been given solely to illustrate the description.

We claim:

1. A magnetic head including a coil and a magnetic circuit of massive form having two legs with a top surface of each of said two legs being coplanar and forming a plane face corresponding to a recording face of the head, characterized in that the magnetic head comprises:
   an interruption in the magnetic circuit substantially perpendicular to said plane face and between said two top surfaces of said legs, said interruption comprising a non-magnetic material which has one surface flush with the top surface of said two legs of the plane face of the magnetic circuit;
   two sections forming magnetic poles of the head, each one of said two sections being a thin layer deposited on a respective one of said two top surfaces of said two legs of said plane face and on said one surface of said non-magnetic material and said two sections being separated from each other by a gap defined by edges of said magnetic poles facing each other and each of said poles having a narrow portion proximate to said gap and a wide portion near a respective one of said legs.

2. Magnetic head according to claim 1, characterized in that the magnetic circuit comprises two parts each part in the shape of a "U" having its ends (13, 13' and 14, 14') respectively bonded to each other by a layer of bonder, one of the ends, (14, 14') of at least one of these two parts having a portion made of non-magnetic material (6) flush with said plane face (10) each of said sections forming said magnetic poles being made on said plane face (10) with the gap (5) located at the portion made of non-magnetic material (6).

3. Magnetic head according to claim 2, characterized in that edges (30, 30') of the magnetic poles (3, 3') are bonded to each other by said layer of bonder which then forms said gap between said poles.

4. Magnetic head according to claim 2, characterized in that at least one of the bonded ends (13, 13', 14, 14') of each U-shaped part (1, 1') forms an angle with respect to the recording face.

5. A magnetic head according to claim 2, characterized wherein said parts have a substantially similar form and are symmetrical about a plane perpendicular to said plane face.

6. Magnetic head according to claim 1, characterized in that the magnetic poles (3, 3') have narrowed shapes at edges of the gap (5).

7. Magnetic head according to claim 1, characterized in that edges (30 and 30') of the magnetic poles (3, 3') facing each other and defining the gap (5) form an angle of 90° with respect to the recording face.

8. A magnetic head comprising:
   two magnetic pieces each having a length and a width and separated from each other by a non-magnetic element with a top of each of said two magnetic pieces and a top of said non-magnetic element being coplanar and providing a plane face;
   two magnetic poles respectively associated with said two magnetic pieces, said poles including two respective magnetic layers formed on said plane face separated by a gap located on said non-magnetic element said gap defined by edges of said two magnets facing each other and said edges being perpendicular to said plane face, with said non-magnetic element having an element width substantially greater than said gap and with each of said two magnetic layers having a length greater than said length of each of said magnetic pieces and each of said two magnetic layers further having a first width portion corresponding to the width of each of said two magnetic pieces and each of said two magnetic layers further including a second width portion wherein said first width is the width of said respective magnetic layers positioned on said plane face above each of said magnetic pieces and wherein the second width is the width of said respective magnetic layers at said gap with said second width being less than said first width.

9. A magnetic head according to claim 8, in that each magnetic layer has a gradient of width between said first width and said second width.

* * * * *

UNITED STATES PATENT AND TRADEMARK OFFICE
CERTIFICATE OF CORRECTION

PATENT NO. : 5,404,260
DATED      : April 4, 1995
INVENTOR(S): Jurgen MACHUI, et al.

It is certified that error appears in the above-indentified patent and that said Letters Patent is hereby corrected as shown below:

Title page
Please delete the PCT information, Items [22], [86] and [87], from the title page On the title page, Item [22] should read: --Filed: May 25, 1993.--

On the title page, Item [63], the Related U.S. Application Data should read:

--Continuation of Ser. No. 758,512, Sep. 6, 1991, abandoned, which is a continuation of Ser. No. 378,197, Jun. 23, 1989, abandoned, which was the national stage of international Appln. No. PCT/FR88/00517, on Oct. 21, 1988.--

Signed and Sealed this

Nineteenth Day of December, 1995

Attest:

BRUCE LEHMAN

*Attesting Officer*  *Commissioner of Patents and Trademarks*